United States Patent
Ekberg et al.

(10) Patent No.: US 9,913,080 B2
(45) Date of Patent: Mar. 6, 2018

(54) METHOD AND APPARATUS FOR AUTOMATIC WIRELESS DATA TRANSFER

(71) Applicant: Nokia Technologies Oy, Espoo (FI)

(72) Inventors: Jan-Erik Ekberg, Vantaa (FI); Mikko Aleksi Uusitalo, Helsinki (FI); Jani Petri Juhani Ollikainen, Helsinki (FI); Joni Jorma Marius Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/897,222

(22) PCT Filed: Jun. 20, 2013

(86) PCT No.: PCT/FI2013/050688
§ 371 (c)(1),
(2) Date: Dec. 9, 2015

(87) PCT Pub. No.: WO2014/202826
PCT Pub. Date: Dec. 24, 2014

(65) Prior Publication Data
US 2016/0150354 A1    May 26, 2016

(51) Int. Cl.
*H04B 5/00* (2006.01)
*H04W 4/00* (2018.01)
*H04B 5/02* (2006.01)

(52) U.S. Cl.
CPC .......... *H04W 4/008* (2013.01); *H04B 5/0031* (2013.01); *H04B 5/0037* (2013.01); *H04B 5/02* (2013.01)

(58) Field of Classification Search
None
See application file for complete search history.

(56) References Cited

U.S. PATENT DOCUMENTS

| | | | |
|---|---|---|---|
| 2008/0018931 A1* | 1/2008 | Tanaka | G06F 3/1204 358/1.15 |
| 2010/0049718 A1 | 2/2010 | Aronovich et al. | |
| 2011/0031928 A1 | 2/2011 | Soar | |
| 2011/0050164 A1 | 3/2011 | Partovi et al. | |
| 2012/0190412 A1 | 7/2012 | Buniatyan | |
| 2012/0256585 A1 | 10/2012 | Partovi et al. | |
| 2012/0313447 A1 | 12/2012 | Park et al. | |
| 2015/0244421 A1* | 8/2015 | Nambord | H01Q 7/00 455/41.1 |

OTHER PUBLICATIONS

International Search Report and Written Opinion received for corresponding Patent Cooperation Treaty Application No. PCT/FI2013/050688, dated May 23, 2014, 14 pages.

(Continued)

*Primary Examiner* — David Bilodeau
(74) *Attorney, Agent, or Firm* — Harrington & Smith

(57) ABSTRACT

An apparatus, a computer program and a method in an apparatus for causing obtaining from a wireless charging detector (220) an indication of the presence of a wireless charging field; causing obtaining from a near field communication circuitry (210) an indication of proximity of a near field communication device (1 10, 120); and responsively to obtaining the indications, causing negotiating with the near field communication device (1 10, 120).

18 Claims, 1 Drawing Sheet

(56) References Cited

OTHER PUBLICATIONS

Aghababaeetafreshi, "A security architecture for a wireless memory", Thesis, Oct. 2013, 81 pages.
Office action received for corresponding Chinese Patent Application No. 201380078982.X, dated Dec. 2, 2016, 10 pages of office action and no page of office action translation available.
Partial Supplementary European Search Report received for corresponding European Patent Application No. 13887128.0, dated Jan. 16, 2017, 6 pages.

* cited by examiner

METHOD AND APPARATUS FOR AUTOMATIC WIRELESS DATA TRANSFER

RELATED APPLICATION

This application was originally filed as PCT Application No. PCT/FI2013/050688 filed Jun. 20, 2013.

TECHNICAL FIELD

The present application generally relates to automatic wireless data transfer.

BACKGROUND

Automatic wireless data transfer is used e.g. for synchronizing mobile phone data with a network based service or with a personal computer of the user of the mobile phone. Such automatic wireless data transfer is often used to backup, update or share calendar entries and messages. The transfer is typically configured to occur with a predetermined period such as once a day or once every 30 minutes.

Some modern mobile phones are provided with near field communication (NFC) circuitry with which such phones can exchange information with proximate devices. This technique is used also in some public transport ticket systems in which an electronic ticket device or tag is merely brought against or next to an NFC ticket validation device. When in proximity, these devices detect each other and perform a process that leaves desired evidence of ticket validation. As NFC typically requires proximity in the range of millimeters or centimeters, the NFC devices are momentarily held together for the ticket validation purpose. Moreover, as the communication connection between NFC devices remains for an unknown and possibly very short period of time, NFC is typically used for transactions in which two NFC devices can be placed next to each other and in which relatively small amounts of information are transferred.

SUMMARY

Various aspects of examples of the invention are set out in the claims.

According to a first example aspect of the present invention, there is provided an apparatus, comprising:
a near field communication circuitry;
a wireless charging station detector; and
a processor configured to:
  cause obtaining from the wireless charging detector an indication of the presence of a wireless charging field;
  cause obtaining from the near field communication circuitry an indication of proximity of a near field communication device; and
  responsively to obtaining the indications, negotiate with the near field communication device.

According to a second example aspect of the present invention, there is provided a method, comprising:
causing obtaining from a wireless charging detector an indication of the presence of a wireless charging field;
causing obtaining from a near field communication circuitry an indication of proximity of a near field communication device; and
responsively to obtaining the indications, causing negotiating with the near field communication device.

According to a third example aspect of the present invention, there is provided a computer program comprising:
code for causing obtaining from a wireless charging detector an indication of the presence of a wireless charging field;
code for causing obtaining from a near field communication circuitry an indication of proximity of a near field communication device; and
code for, responsively to obtaining the indications, causing negotiating with the near field communication device;
when the computer program is run on a processor of an apparatus.

According to a fourth example aspect of the present invention, there is provided a computer program product comprising a computer-readable medium bearing the computer program code embodied therein for use with a computer.

According to a fifth example aspect of the present invention, there is provided a computer-readable medium encoded with instructions that, when executed by a computer, perform the method of any of the second example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. The memory medium may be a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
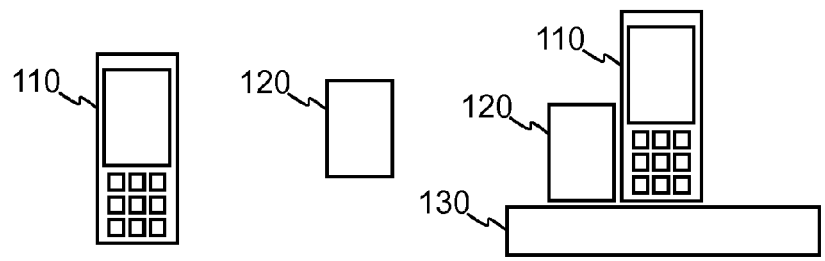
FIG. 1 shows an architectural overview of a system of an example embodiment of the invention.

FIG. 1 shows an architectural overview of a system 100 of an example embodiment of the invention. The system comprises a plurality of user apparatuses 110, tags 120 (e.g. passive near field communication or NFC tags), and a wireless charger 130.

The user apparatuses 110 can be of same or different types. In an example embodiment, the user apparatuses 110 are selected from a group consisting of mobile phones; personal digital assistants; tablet computers; handheld devices; navigation devices; game devices; and electronic books.

In an example embodiment, the wireless charger is a unit compatible with the Qi® standard by the Wireless Power Consortium® e.g. such as those published for Nokia Lumia® 920 mobile phone in 2012.

In an example embodiment, the tags 120 are active (self-powered), semi-passive or passive (wirelessly powered during communications e.g. by an NFC signal). A semi-passive tag is e.g. one that is capable of storing some energy for autonomous operations e.g. to collect information such as sensor data and/or to output information such as actuator output data. In an example embodiment, some or all of the tags 120 may contain a user interface (e.g. display, keys, touch surface). Other tags 120 may lack a user interface.

Figure 2:
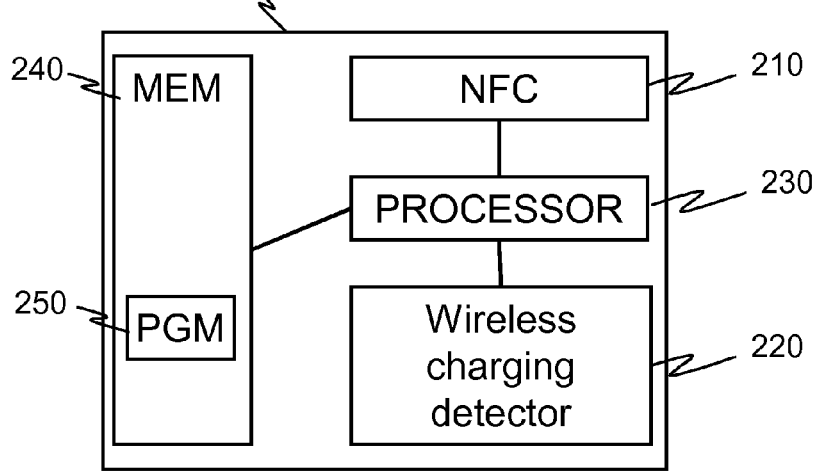
FIG. 2 shows an apparatus suitable for operating as the user apparatus or as a tag of an example embodiment.

FIG. 2 shows an apparatus 200 suitable for operating as the user apparatus 110 or as a tag 120 of an example embodiment. The apparatus 200 comprises a near field communication circuitry 210; a wireless charging station detector 220; and a processor 230 that is configured to:

cause obtaining from the wireless charging detector 220 an indication of the presence of a wireless charging field;

cause obtaining from the near field communication circuitry 210 an indication of proximity of a near field communication device (e.g. a tag 120 or another user apparatus 110); and responsively to obtaining the indications, negotiate with the near field communication device 120, 110.

It should be understood that the processor 230 and/or any other functional or structural parts of the apparatus or any other elements of this document can be formed of more than one components or circuitries.

In an example embodiment, the wireless charging detector 220 comprises a wireless charging receiver configured to obtain wireless energy from the wireless charger 130. In another example embodiment, the wireless charging detector 220 comprises a pickup element such as an antenna or a coil, configured to form an electric current when wireless charging is available to the apparatus 200, and an electric current detection circuitry. The current detection circuitry comprises, or is formed using, for example, a suitable application specific circuitry (ASIC), a transistor, a resistor, analog-to-digital converter or another circuitry suited for forming a digital indication of the availability of the wireless charging when the pickup element forms the electric current that indicates the availability of the wireless charging.

In an example embodiment, the apparatus 200 is configured to obtain its operating power by the near field communication circuitry 210. In an example embodiment, the apparatus 200 comprises a power supply independent of the near field communication circuitry 210.

In an example embodiment, the negotiating is performed by near field communication.

In an example embodiment, the processor 230 is configured to establish a communication session with the near field communication device 120, 110, responsively to the negotiating resulting in authorizing of one of the apparatus 200 and the near field communication device 120, 110 to access the other one of the apparatus 200 and the near field communication device 120, 110.

In an example embodiment, the communication session is established for near field communication.

In an example embodiment, the apparatus 200 comprises a non-volatile 240 memory for storing information. In an example embodiment, the non-volatile memory comprises a plurality of memory segments. In an example embodiment, the non-volatile memory comprises software 250 such as computer executable program code for execution of the processor 230.

In an example embodiment, the apparatus 200 comprises an access control unit configured to allow access to information stored in the non-volatile memory according to predefined access information. In an example embodiment, the access information is stored in the non-volatile memory.

In an example embodiment, the access information comprises party specific access information. The party specific access information comprises, for example, a party identification such as an identifier of company, organization, person, owner or jurisdiction with which the apparatus 200 is associated. In an example embodiment, the party specific access information comprises one or more access codes (e.g. four) such as a PIN code or a derivative thereof, such as a one-directional cryptographic hash code.

In an example embodiment, the access information comprises memory segment specific access information. In an example embodiment, the segment specific access information is stored as metadata associated with each managed segment of the non-volatile memory.

The memory segment specific access information comprises, for example, memory segment specific read permission flags. The read permission flags are stored, for example, within a control byte as particular bits such as one copy(out) bit per one memory segment.

In an example embodiment, the memory segment specific access information comprises memory segment specific write permission flags. The write permission flags are stored, for example, within a control byte as particular bits such as one copy(in) bit per one memory segment.

In an example embodiment, the memory segment specific access information comprises memory segment specific edit permission flags. In an example embodiment, the memory segment specific access information comprises a pointer to an access code for reading permission. In an example embodiment, the memory segment specific access information comprises a pointer to an access code for writing permission. In an example embodiment, the memory segment specific access information comprises a pointer to an access code for editing permission.

In an example embodiment, the editing permission allows a source apparatus to move a segment metadata+content to a target apparatus. It is understood that the segments are not necessarily placed in a 1-1-fashion on the source and target apparatuses. Hence, suitable segments can be searched in the target based on the edit flags. In this context, the suitable segments are, for example, ones that are (still) editable by the source. The source apparatus can then dump its source segment data in a suitable target segment and lock up the target segment so that a future copy to the same target has to use another (empty or overwritable) segment.

In an example embodiment, the access information comprises a rollback counter.

In an example embodiment, the access control unit is configured to cause the apparatus 200 to authorize the near field communication device 120, 110 to access the apparatus 200. In an example embodiment, the access control unit is configured to perform the authorizing based on the access information. In an example embodiment, the access control unit is configured to test whether any of the memory segment specific access information comprises a pointer to an access code received from the near field device for any of reading, writing or editing any of the memory segments. In an example embodiment, the access control unit is configured to test if such an access code has been used by the near field device as an encryption key or as part of an encryption key to encrypt said rollback counter.

In an example embodiment, the access control unit is configured to cause the apparatus 200 to authorize to the near field communication device 120, 110 access of the apparatus 200 to the near field communication device 120, 110. In an example embodiment, the access control unit is configured to perform the authorizing to the near field communication device 120, 110 the access of the apparatus 200 to the near field communication device 120, 110 based on the access information.

In an example embodiment, the non-volatile memory comprises a file system. In an example embodiment, the file system corresponds to one of the memory segments. In an alternative example embodiment, the file system is configured to comprise the segment-specific control portion configured to store access information for each of the plurality of memory segments.

In an example embodiment, the processor 230 is configured to receive, in the negotiating, a PIN code signaled for writing and to responsively verify whether the non-volatile memory comprises memory segments associated with the received PIN code to which the near field communication device 120, 110 is allowed to write information.

In an example embodiment, the processor 230 is configured to receive, in the negotiating, a PIN code signaled for reading and to responsively verify whether the non-volatile memory comprises memory segments associated with the received PIN code from which the near field communication device 120, 110 is allowed to read information.

In an example embodiment, the processor 230 is configured to operate the apparatus 200 as a master when the near field communication device 120, 110 operates as a slave. In an example embodiment, the processor 230 is configured to cause the near field communication circuitry 210 to signal at least a portion of the party specific access information to the near field communication device 120, 110.

In an example embodiment, the processor 230 is configured to operate the apparatus 200 as a slave when the near field communication device 120, 110 operates as a master.

In an example embodiment, the processor 230 is configured to determine whether the apparatus should operate as master or slave e.g. based on one or more properties associated with the apparatus 200 and with the near field communication device 120, 110. The properties comprise, for example, internet protocol (IP) address; media access control (MAC) address; uptime; availability of external power; battery level; whether the apparatus is an active device; rollback counter value; any derivative thereof; and any combination thereof.

In an example embodiment, the rollback counter is used as communication freshness guarantee. The same rollback counter can also be used as a cryptographic element (e.g. seed; encryption key; and/or a portion thereof). Furthermore, the rollback counter is used in an example embodiment to control synchronizing e.g. so that only changed information is transferred.

In an example embodiment, the processor 230 is configured to change the operating of the apparatus 200 between master and slave operation. In an example embodiment, the change is initiated by the master, regardless whether the apparatus 200 or the near field communication device 120, 110 operates as the master. In an example embodiment, the change is initiated after the master has performed all the write operations and read operations on the slave.

In an example embodiment, the processor 230 is configured to exchange information between the apparatus 200 and the near field communication device 120, 110 in the communication session. In an example embodiment, the exchange of information is responsive to the obtaining of the indications.

In an example embodiment, the processor 230 is configured cause issuing a completion signal to a user of the apparatus 200 when the exchange of information is completed. The completion signal comprises e.g. a visual signal; an audible signal; and/or a tactile signal.

In an example embodiment, the exchange of information comprises synchronizing the slave with the master.

In an example embodiment, the exchange of information comprises synchronizing the near field communication device 120, 110 with the apparatus 200.

In an example embodiment, the exchange of information comprises synchronizing the apparatus 200 with the near field communication device 120, 110.

In an example embodiment, the synchronizing is memory segment specific.

In an example embodiment, the system 100 is configured such that a user can use the wireless charger 130 like a copy machine to copy content from one apparatus or device to another simply by placing two apparatuses 200 in the charging field of the wireless charger 130, e.g. by laying the apparatus onto a charging pillow. In case that either of the two apparatuses 200 has a user interface, it is also possible to inform the user of particular content being copied and/or to let the user to select the content to be copied. In an example embodiment the apparatuses 200 are equipped with epaper or similar display and content from one display is copied as with a copy machine. For instance, assume that two tags A and B are placed on a wireless charger. A first tag A shows a content C, and the second tag B shows nothing (or default content such as a default picture). After placing the first and second tags on the wireless charger, the content C presented by tag A is also copied to tag B and possibly also presented on its display.

In an example embodiment, the apparatus 200 is so configured to perform the negotiation and to exchange information even when switched off. In this example embodiment, the apparatus 200 is configured to activate the parts thereof that are needed for the negotiation and information exchange when placed in the charging field of the wireless charger 200. In an example embodiment, the apparatus 200 is configured to detect if the near field communication device 120, 110 provides information indicating that the near field communication device 120, 110 is configured to operate as a recovery or update medium for the apparatus 200 and to responsively restore or update its software such as operating software. In this case, the apparatus 200 can also be configured to first warn the user about changing its software and prompt for user approval. Moreover, an apparatus (e.g. near field communication device 120, 110) providing a software recovery or backup can be further configured to obtain recovery or update information from a network element, if a network connection is available. For example, the apparatus 110 may download the update and configure the tag 120 according to a query from the tag 120. Still further, the update may be initiated also by the apparatus 110 or by a network service.

In yet another example embodiment, the update in question is operating software or a functional configuration of the tag 120 itself. Then, the functionality of tag 120 may be easily reconfigurable by the user. As an example, the tag 120 may be first configured to operate in passive mode only (no sensor data collection). After an update via 110, tag 120 is reconfigured to collect data in semi-passive mode e.g. with a sampling-rate of 1 sample/hour. As yet another example, the sampling-rate can be updated during another interaction to be changed e.g. to 1 sample/minute.

In an example embodiment, the wireless charger 130 is configured to detect completion of the synchronizing of information based on, for example, near field communication signaling or from charging current consumed as indication of ongoing data transfer, for example. The wireless charger 130 can then issue a completion signal to the user.

Figure 3:
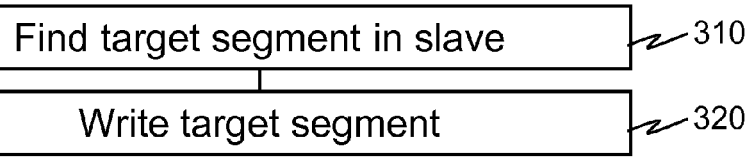
FIG. 3 shows a process according to an example embodiment.

FIG. 3 shows a process according to an example embodiment. The process comprises a recurring loop that comprises the steps of:

310. Find a segment in the slave that is marked copy(in) AND that has WRITE PIN associated with a MASTER PIN with which authorization has been gained to write in the slave device AND that has an EDIT PIN associated with the same MASTER PIN. For example, we may assume that the source apparatus may have a secret (one MASTER PIN). In the target apparatus, for one segment both the right to write the segment (WRITE) and the right to write the metadata area (EDIT) should be available to the source apparatus (e.g. by virtue of the source knowing the MASTER PIN) before the source should write the segment—as the source changes both the data and the metadata of the segment in question.

320. Write the information for this segment in the slave as a copy of information of the segment to be written from the master with the following exceptions:

Copy(in) and copy(out) flags are both zeroed

The rollback counter binding of the management record is set to the current slave RBPCTR value+1. This rollback counter value can then be used both as a binding parameter and as indication of the time of transfer.

The EDIT and WRITE PIN pointers are not changed in the slave

The READ PIN pointer is set to same value as the EDIT PIN pointer.

Figure 4:
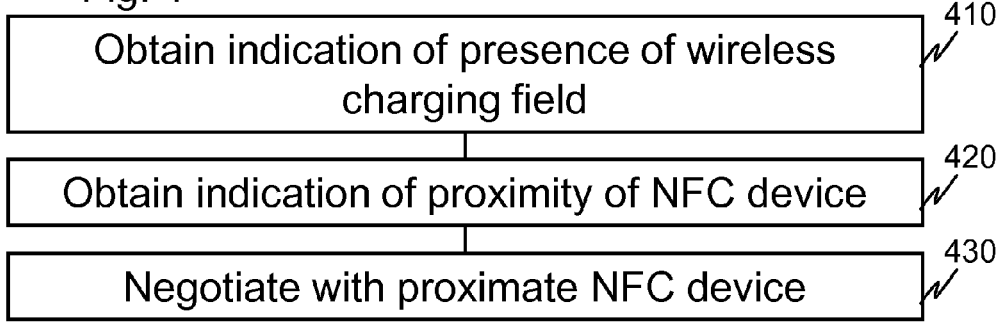
FIG. 4 shows a process according to an example embodiment.

FIG. 4 shows a process according to another example embodiment.

The process comprises the steps of:

410. causing obtaining from a wireless charging detector an indication of the presence of a wireless charging field;

420. causing obtaining from a near field communication circuitry an indication of proximity of a near field communication device; and

430 responsively to obtaining the indications, causing negotiating with the near field communication device.

Without in any way limiting the scope, interpretation, or application of the claims appearing in the following, a technical effect of one or more of the example embodiments disclosed herein is that data can be automatically transferred from one apparatus to another when desired by a user. Another technical effect of one or more of the example embodiments disclosed herein is that a wireless charger can be used like a copy machine to copy information from one apparatus to another. Yet another technical effect of one or more of the example embodiments disclosed herein is that such copying can be subjected to preset conditions that can be cryptographically asserted so as to prohibit non-authorized access. Yet another technical effect of one or more of the example embodiments disclosed herein is that data transfer can be triggered without necessarily having or using any user interface on either apparatus between which data is to be transferred.

Embodiments of the present invention can be implemented in software, hardware, application logic or a combination of software, hardware and application logic. In an example embodiment, the application logic, software or an instruction set is maintained on any one of various conventional computer-readable media. In the context of this document, a "computer-readable medium" is any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that is any media or means that can contain or store the instructions for use by or in connection with an instruction execution system, apparatus, or device, such as a computer.

If desired, the different functions discussed herein can be performed in a different order and/or concurrently with each other. Furthermore, if desired, one or more of the functions described in the foregoing is/are optional or can be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, several variations and modifications can be made without departing from the scope of the present invention as defined in the appended claims.

What is claimed is:

1. An apparatus, comprising:
   a near field communication circuitry;
   a wireless charging station detector;
   at least one processor; and
   at least one non-transitory memory including a computer program code; and
   an access controller configured to allow access to information stored in the non-transitory memory according to predefined access information, wherein the predefined access information comprises a rollback counter, wherein the rollback counter is used as a communication freshness guarantee to ensure that only changed information is transferred,
   wherein the at least one non-transitory memory and the computer program code are configured, with the at least one processor, to cause the apparatus to:
   obtain from the wireless charging detector an indication of the presence of a wireless charging field;
   obtain from the near field communication circuitry an indication of proximity of a near field communication device; and
   in response to obtaining the indication of proximity of the near field communication device, negotiate with the near field communication device based at least in part on the rollback counter, wherein the negotiating is performed by near field communication.

2. The apparatus of claim 1, configured to obtain its operating power by the near field communication circuitry.

3. The apparatus of claim 1, wherein the processor is configured to establish a communication session with the near field communication device, in response to the negotiating resulting in authorizing of one of the apparatus and the near field communication device to access the other one of the apparatus and the near field communication device.

4. The apparatus of claim 3, wherein the processor is configured to cause exchanging of information between the apparatus and the near field communication device in the communication session, wherein the exchange of information is in response to the obtaining of the indications.

5. The apparatus of claim 3, wherein the communication session is established for near field communication.

6. The apparatus of claim 1, wherein the access information further comprises party specific access information including a party identification.

7. The apparatus of claim 1, wherein the access information comprises memory segment specific access information, wherein the memory segment specific access information comprises memory segment specific read permission flags.

8. The apparatus of claim 1, wherein the apparatus further comprises a tag device that is semi-passive device, wherein a semi-passive is capable of storing energy for autonomous operations; and the apparatus further comprises:
 a user interface that includes at least one of a display, keys, and a touch surface.

9. The apparatus of claim 1, wherein the access information comprises a one-directional cryptographic hash code.

10. The apparatus of claim 1, wherein comprising information comprises memory segment specific edit permission flags, wherein the memory segment specific access information comprises at least one of a pointer to an access code for reading permission, a pointer to an access code for writing permission, and a pointer to an access code for editing permission.

11. The apparatus of claim 10, wherein the apparatus comprises one of a source apparatus and a target apparatus and the editing permission allows the source apparatus to move a segment metadata content to the target apparatus.

12. The apparatus of claim 11, wherein at least one suitable segment is searchable in the target apparatus based on at least one edit flag, wherein the at least one suitable segments includes a segment that is editable by the source apparatus; and
 the source apparatus is operable to dump a source segment data in a suitable target segment in the target apparatus and to lock up the suitable target segment.

13. The apparatus of claim 1, wherein the access controller is configured to authorize the near field communication device based on the access information based on a test to determine if an access code has been used by the near field communication device as at least one of an encryption key and a part of an encryption key to encrypt the rollback counter.

14. The apparatus of claim 1, wherein the at least one non-transitory memory and the computer program code are further configured, with the at least one processor, to cause the apparatus to:
 determine, based on at least one property, whether the apparatus is to cause a near field communication circuitry associated with the apparatus to signal at least portion of the party specific access information to the near field communication device and is to be configured to perform write and read operations on the near field communication device.

15. The apparatus of claim 14, wherein the at least one property includes at least one of an internet protocol (IP) address, media access control (MAC) address, uptime, availability of external power; battery level, a property indicating whether the apparatus is an active device; and a rollback counter value.

16. A method comprising:
 obtaining from the wireless charging detector an indication of a presence of a wireless charging field, by an apparatus that includes a wireless charging detector and an access controller configured to allow access to information stored in the non-transitory memory according to predefined access information, wherein the predefined access information comprises a rollback counter, wherein the rollback counter is used as a communication freshness guarantee to ensure that only changed information is transferred;
 obtaining from a near field communication circuitry an indication of proximity of a near field communication device;
 in response to obtaining the indication of proximity of the near field communication device, negotiating with the near field communication device based at least in part on the rollback counter, wherein the negotiating is performed by near field communication; and
 obtaining operating power for the apparatus by the near field communication circuitry.

17. The method of claim 16, further comprising;
 establishing a communication session with the near field communication device, in response to the negotiating resulting in authorizing of one of the apparatus and the near field communication device to access the other one of the apparatus and the near field communication device; and
 exchanging information between the apparatus and the near field communication device in the communication session.

18. A computer program product, comprising at least one non-transitory computer readable storage medium having a computer readable program code portion stored thereon, the computer readable program code portion comprising:
 code for obtaining from a wireless charging detector an indication of a presence of a wireless charging field, by an apparatus that includes the wireless charging detector and an access controller configured to allow access to information stored in the non-transitory memory according to predefined access information, wherein the predefined access information comprises a rollback counter, wherein the rollback counter is used as a communication freshness guarantee to ensure that only changed information is transferred;
 code for obtaining from a near field communication circuitry an indication of proximity of a near field communication device; and
 code for, in response to obtaining the indication of proximity of the near field communication device, negotiating with the near field communication device based on the rollback counter, wherein the negotiating is performed by near field communication.

\* \* \* \* \*